UNITED STATES PATENT OFFICE.

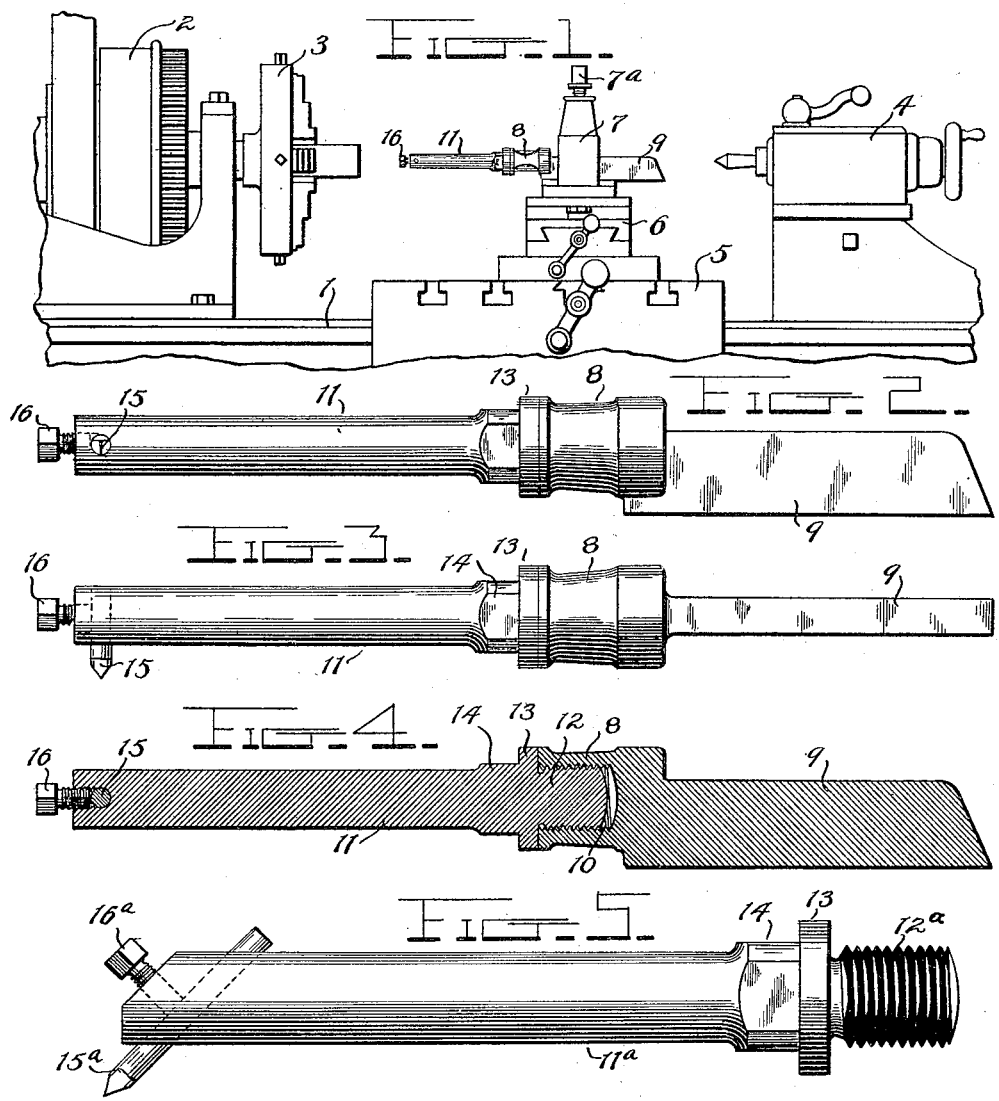

CHARLES PRICE, OF CLINTON, MASSACHUSETTS.

INTERCHANGEABLE-BORING-BAR HOLDER.

1,125,170.	Specification of Letters Patent.	Patented Jan. 19, 1915.

Application filed December 22, 1913. Serial No. 808,220.

*To all whom it may concern:*

Be it known that I, CHARLES PRICE, citizen of the United States, residing at Clinton, in the county of Worcester and State of Massachusetts, have invented certain new and useful Improvements in Interchangeable-Boring-Bar Holders, of which the following is a specification.

The present invention relates to an interchangeable boring bar holder for lathes, the object of the invention being to provide a device of this character which embodies novel features of construction whereby one boring bar may be quickly removed and replaced by another boring bar of a different size or design without the annoyance and loss of time which is usually incident to searching around the shop for the particular boring tool necessary for the work in hand.

Further objects of the invention are to provide an interchangeable boring bar holder which is simple and inexpensive in its construction, which can be readily applied to the tool post of the conventional form of lathe, which does away entirely with blacksmith work, and is a great time saver.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a conventional form of lathe having the interchangeable boring bar holder applied thereto, portions being broken away. Fig. 2 is an enlarged side elevation of the boring bar holder, detached. Fig. 3 is a top plan view of the same. Fig. 4 is a longitudinal sectional view through the device. Fig. 5 is an enlarged detail view of a modified form of boring bar.

Corresponding and like parts are referred to in the following description and indicated in all the views of the drawings by the same reference characters.

In Fig. 1 the interchangeable boring bar holder has been shown as applied to a conventional form of lathe. The numeral 1 designates the bed of the lathe, 2 the head stock which is provided with the usual chuck 3, and 4 the tail stock. The main feed block 5 is mounted for longitudinal movement upon the bed 1 and carries the upper feed block 6 which is mounted for transverse adjustment and has the usual tool post 7 projecting upwardly therefrom. The boring tool holder includes a head 8 which is substantially cylindrical in shape and an integral tail or wing 9 projecting rearwardly therefrom and adapted to be clamped in the usual manner within the slotted portion of the tool post 7 by means of the clamping nut 7$^a$. The outer end of the head 8 is provided with an axially disposed threaded opening 10, while the flat tail piece 9 projects rearwardly from the head, the longitudinal axis of the tail piece being parallel to and offset downwardly from the longitudinal axis of the head 8.

One form of boring bar 11 is illustrated in Figs. 2, 3 and 4, the rear end thereof being formed with a threaded stem 12 adapted to be screwed into the threaded socket 10 of the head 8. A flange 13 at the base of the stem 12 is adapted to abut against the end of the head 8 when the boring bar has been properly threaded into position, and the portion of the boring bar adjacent the flange 13 has an angular formation as indicated at 14 so as to be readily engaged by a wrench or tool when placing the boring bar in position or removing it therefrom. The abutting faces of the flange 13 and head 8 are preferably hardened so as to avoid wear of the metal at this place. The outer end of the boring bar 11 has a transverse opening adapted to receive a cutter or bit 15, a set screw 16 being provided for clamping the bit rigidly in position. The point of the bit 15 may be adjusted to project any distance from the boring bar, and the bit may be rotated within the opening to increase or decrease the "rake" of the tool. In the construction shown by Figs. 2, 3 and 4 the bit 15 is disposed at right angles to the axis of the boring bar 11.

Another form of boring bar 11$^a$ is illustrated by Fig. 5. The rear end of this boring bar is provided as in the previous instance with the threaded stem 12$^a$ adapted to be screwed into the socket 10 of the head 8 of the tool holder, while the outer end of the boring bar has an inclined opening to receive the bit or cutter 15$^a$. A set screw 16$^a$ is provided for clamping the bit 15$^a$ rigidly in an adjusted position, and when it is desired to substitute the boring bar 11ᵃ for the boring bar 11, or vice versa, it is merely necessary to unscrew one of the boring bars from the head 8 of the tool holder and to screw the other boring bar in position, all of the various boring bars being interchangeable and having a threaded stem 12 adapted to engage the socket 10 of the head 8. The holder thus remains clamped in position within the tool post 7, the same tool holder being adapted to be used interchangeably with all of the boring bars so that when it is necessary to use a heavier or a lighter boring bar, or a boring bar having the bit set at a different angle, instead of searching around the shop for a new boring tool answering the requirements, the operator merely unscrews one boring bar from the tool holder and screws another boring bar answering the requirements into position.

Having thus described the invention what I claim as new and desire to secure by Letters Patent, is:—

The herein described interchangeable boring bar holder including an elongated flat tail piece of substantially uniform cross section adapted to be clamped within the tool post of a lathe, a cylindrical head integral with one end of the flat tail piece and having the axis thereto parallel to but offset from the axis of the tail piece, said head being formed with an axially disposed threaded socket, an independent boring bar provided at one end with a threaded stem adapted to be fitted within the threaded socket of the cylindrical head, while the opposite end thereof is formed with a transverse opening, an annular flange being provided at the base of the threaded stem for engagement with the end of the head when the boring bar is properly seated in position, while the portion of the boring bar adjacent the flange has an angular formation so as to be engaged by a wrench, a bit adjustably mounted within the transverse opening of the boring bar, and a set screw engaging the bit to hold the same in an adjusted position.

In testimony whereof I affix my signature in presence of two witnesses.

CHARLES PRICE.

Witnesses:
ARTHUR L. NICHOLS,
WILLIAM S. DUNCAN.